US009673470B2

(12) United States Patent
Zahir et al.

(10) Patent No.: US 9,673,470 B2
(45) Date of Patent: Jun. 6, 2017

(54) ELECTROLYTE LAYER HAVING A PATCHWORK-TYPE NANOPOROUS GRAIN BOUNDARY AND A METHOD OF PREPARATION THEREOF

(71) Applicant: King Fahd University of Petroleum and Minerals, Dhahran (SA)

(72) Inventors: Md Hasan Zahir, Dhahran (SA); Haitham M Bahaidarah, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 327 days.

(21) Appl. No.: 14/160,948

(22) Filed: Jan. 22, 2014

(65) Prior Publication Data

US 2015/0206999 A1 Jul. 23, 2015

(51) Int. Cl.
*H01M 8/10* (2016.01)
*H01M 8/1246* (2016.01)
*H01M 8/126* (2016.01)
*C04B 35/50* (2006.01)
*C04B 35/622* (2006.01)
(Continued)

(52) U.S. Cl.
CPC ........... *H01M 8/1246* (2013.01); *C04B 35/50* (2013.01); *C04B 35/62218* (2013.01); *C04B 35/62695* (2013.01); *C04B 35/634* (2013.01); *C04B 41/009* (2013.01); *C04B 41/5045* (2013.01); *C04B 41/87* (2013.01); *H01M 8/126* (2013.01); *C04B 2111/00853* (2013.01); *C04B 2235/3229* (2013.01); *C04B 2235/5445* (2013.01); *C04B 2235/785* (2013.01); *C04B 2235/786* (2013.01); *C04B 2235/85* (2013.01);
(Continued)

(58) Field of Classification Search
CPC ................ H01M 8/1246; H01M 8/126; C04B 35/62218; C04B 35/62695; C04B 35/634
See application file for complete search history.

(56) References Cited

U.S. PATENT DOCUMENTS 7,655,333 B2    2/2010  Huang et al.
2003/0129460 A1*  7/2003  Donelson ............... B32B 18/00
                                                          429/484
(Continued)

OTHER PUBLICATIONS

Jongmo Im, et al., "Effect of atomization methods on the size and morphology of $Gd_{0.1} Ce_{0.9} O_{2-\delta}$ powder synthesized by aerosol flame synthesis", Apr. 2012, Ceramics International, vol. 38, Issue 3, (1 page).

(Continued)

*Primary Examiner* — Helen O Conley
(74) *Attorney, Agent, or Firm* — Oblon, McClelland, Maier & Neustadt, L.L.P.

(57) ABSTRACT

Gadolinium-doped cerium oxide slurries used to form a patchwork type surface structure with nanoporous grain boundary prepared by mixing gadolinium-doped cerium oxide and a polymer binder to form a first mixture; wet-atomizing the first mixture under a pressure of at least 100 MPa to obtain a second mixture; coating the second mixture to a substrate to form a coated substrate; and sintering the coated substrate. The patchwork type structure is a polygonal or honeycomb structure having a size of from 0.1 μm to 3 μm.

16 Claims, 2 Drawing Sheets

(51) Int. Cl.
*C04B 35/626* (2006.01)
*C04B 35/634* (2006.01)
*C04B 41/87* (2006.01)
*C04B 41/00* (2006.01)
*C04B 41/50* (2006.01)
*H01M 8/124* (2016.01)
*C04B 111/00* (2006.01)

(52) U.S. Cl.
CPC ............... *H01M 2008/1293* (2013.01); *H01M 2300/0074* (2013.01); *Y02E 60/525* (2013.01); *Y02P 70/56* (2015.11)

(56) References Cited

U.S. PATENT DOCUMENTS

| | | |
|---|---|---|
| 2005/0271931 A1 | 12/2005 | Finnerty |
| 2011/0076589 A1 | 3/2011 | Chao et al. |
| 2012/0003565 A1 | 1/2012 | Son et al. |
| 2013/0102805 A1 | 4/2013 | Hong et al. |

OTHER PUBLICATIONS

M.H. Zahir, et al., "Wet Atomisation of Gd-doped $CeO_2$ Electrolyte Slurries for Intermediate Temperatures'Microtubular SOFC Applications", 2009, Fuel Cells 09, No. 2, (6 pages).

Md. Hasan Zahir, et al., "Effects of Polymer Binder in Electrolyte Slurries and Their Microtubular SOFC Applications", Apr. 2013, Journal of Fuel Cell Science and Technology, vol. 10, (5 pages).

* cited by examiner

ELECTROLYTE LAYER HAVING A PATCHWORK-TYPE NANOPOROUS GRAIN BOUNDARY AND A METHOD OF PREPARATION THEREOF

BACKGROUND

Field of the Disclosure

The present disclosure relates generally to a method for preparing a metal oxide slurry, its use for forming an electrolyte layer having a patchwork-type surface structure with a nanoporous grain boundary, and the electrolyte layer thereby formed. The metal oxide cart be gadolinium-doped cerium, oxide, zinc oxide, or anything else. The metal oxide slurry prepared by the method is useful in fabricating a thin and dense electrolyte layer for fuel cells, as well as in manufacturing thin film solar cells and as a transparent conductive oxide for solar energy storage.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

As a renewable and sustainable energy source alternative to fossil fuel, solar energy has been attracting a lot of attention. Various technologies, including solar heating, solar photovoltaics, and solar thermal energy technologies have been utilized to capture solar energy. Although solar energy is the most abundant renewable energy, conventional solar energy devices utilize only a fraction of available solar. There is an urgent need to develop a device having high utilization efficiency of solar energy. One method to effectively capture solar energy is in the form of chemical bonds, as in photosynthesis, brought about by splitting water photoelectrochemically.

Development of semiconductors, semiconductor materials and ceramic materials capable of directly converting sunlight into fuels may provide a singular solution to convert, capture and store solar energy. Homeowners could use solar panels during the day to generate power to their home by having solar-generated stored energy to split water into hydrogen and oxygen for later combustion, and further energy generation. At night, the stored hydrogen, and oxygen can be recombined, using a fuel cell to generate electrical and thermal power while the solar panels would otherwise be inactive.

Transparent conductive oxide (TCO) is an optically transparent and electrically conductive doped metal oxide used for thin film silicon solar cells. TCO has to transmit as much light as possible through a substrate window to the active light-absorbing material beneath, as well as carry the current as an ohmic contact with minimal resistive losses. Indium tin oxide, fluorine-doped tin oxide, and doped zinc oxide are generally used as an inorganic film of a layer of TCO. Among them, doped zinc oxide is a strong TCO candidate to store solar energy due to its high transparency and high conductivity. Various attempts have been made to deposit a ZnO based TCO thin film to lower the resistivity.

Fabrication of thin films used as electrolytes for solid oxide fuel cells (SOFCs) has been intensively studied recently in an effort to reduce the operating temperature of SOFCs. SOFCs convert chemical energy of a fuel directly to electrical energy. Doe to its high energy conversion efficiency and fuel flexibility. SOFCs have a wide variety of applications. However, SOFCs operate at a high temperature—from 500 to 1000° C.—and utilize a solid oxide or a ceramic as an electrolyte. Such high operating temperature limits commercial use of this technology because acceptable performance could only be achieved from a very small number of cells, and configuration of 3 commercial scale power system with such a small number of cells is not cost-effective.

Ceria-based electrolytes are of current interest for application in intermediate temperature-solid oxide fuel cells (ITSOFCs) due to their high ionic conductivity. Gadolinium doped ceria (GDC), for example, has significantly higher ionic conductivity than that of yttria stabilized zirconia. Suzuki et al, have reported that microtubular cells can generate over 1 W $cm^{-2}$ at 550° C. with a ceria-based electrolyte [Suzuki, T., Zahir, H., Funahashi, Y., Yamaguchi, T., Fujishiro, Y., and Awano, M., 2009, "Impact of anode microstructure on solid oxide fuel cells," Science, 325, pp. 852-855—incorporated herein by reference]. However, at lower temperatures, the conductivity of ceria-based electrolytes significantly decreases. Ohmic losses from the electrolyte can be minimized through the use of a thinner electrolyte [see: Leah, R. T., Brandon, N. P., and Aguiar P., 2005, "Modelling of cell, stacks and systems based around metal-supported planar IT-SOFC cells with CGO electrolytes operating at 500-600° C." J. Power Sources, 145, pp. 336-352; Suzuki, T. Zahir, H, Yamaguchi, T, Fujishiro, Y. Awano, M. Fabrication of micro-tubular solid oxide fuel cells with a single-grain-thick yttria stabilized zirconia electrolyte. J. Power Sources 2010; 195:7325-7828; and Suzuki, T. Zahir, H., Funahashi, Y. Yamaguchi, T., Fujishiro, Y., and Awano, M., 2008, "Fabrication and Characterization of Microtubular SOFCs with Multilayered Electrolyte," Electro. & Solid-State Letters, 11(6), pp. B87-90; each incorporated herein by reference]. Highly dispersed nano-size GDC slurry with homogeneous distribution is indispensable for fabricating a dense and thin electrolyte layer.

Recently, in the chemical engineering and food technology fields, a wet atomizing system has been developed as a new method of mixing and dispersing [Zahir, Md. H., Suzuki T., Yamaguchi, T., Fujishiro, Y., and Awano, M., 2009 "Wet atomization of Gd-doped $CeO_2$ electrolyte slurries for intermediate temperature microtubular SOFC application"Fuel Cells, 9, pp. 164-169—incorporated herein by reference]. Using this system, particle size reduction and homogenizations are achieved within a short period or time. Therefore, attempts were made to synthesize the GDC slurries through the use of wet atomizing systems for the preparation of nanosized particles. The wet atomizing system divides the pressurized fluid in one channel and creates a cross-collision for atomization, emulsification, and dispersion. Dispersion by means of a high-pressure atomizer is performed by the large shearing force generated when a liquid is passed through an extremely narrow (small) gap at high speed. As a result, a fine homogeneous solid solution could be obtained within a very short time. It has been reported that the pore-size distributions of gamma-$Al_2O_3$ membranes with the addition of a 3.5 wt % solution of polyvinyl alcohol (PVA) polymer do not show a measurably altered pore structure [Schoonman, J., 2003, "Nanoionics", Solid State Ionics, 157, pp. 319-32—incorporated herein by reference]. Therefore, the optimization of the amount of binder polymer for fabrication of a smooth crack-free electrolyte layer (membrane) is important.

Zahir et al., previously reported a homogeneous GDC electrolyte slurry processing system through the use of wet-atomization; the fabricated SOFC with the atomized electrolytes showed a maximum power density of only 350 mW cm$^{-2}$ at 500° C. [Zahir, Md. H., Suzuki, T., Yamaguchi, T., Fujishiro, Y., and Awano, M., 2009 "Wet atomization of Gd-doped CeO$_2$ electrolyte slurries for intermediate temperature microtubular SOFC application" Fuel Cells, 9, pp. 164-169—incorporated herein by reference]. However, the effect of the binder content has not yet been reported.

The present disclosure describes a method and electrolyte layer that solves the above problems, the present disclosure describes a method in which a higher amount of binder can be used to fabricate a nanoporous natural patchwork-type surface structure which has potential applications in other fields.

SUMMARY

The foregoing paragraphs have been provided by way of general introduction, and are not intended to limit the scope of the following claims. The described embodiments, together with further advantages, will be beat understood by reference to the following detailed description taken in conjunction with the accompanying drawings.

It is an object of the present disclosure is to describe the effect of the binder (polymer) content in an electrolyte slurry.

It is a further embodiment of the disclosure to provide a method for using a metal-oxide slurry in a wet-atomization process.

It is a further embodiment of the disclosure to provide a wet-atomization process using particular characteristics of atomizer pressure and number of cycles for the preparation of the electrolyte slurry.

It is a further object of the disclosure to provide a process for the synthesis and fabrication of a GDC thin layer.

It is a further embodiment of the disclosure to provide an electrolyte for SOFC application.

It is a further embodiment of the disclosure to provide a method to prepare a metal oxide layer having with a nanoporous grain boundary.

It is a further embodiment of the disclosure to provide an electrolyte layer having a nanoporous grain boundary and its use to fabricate an SOFC and/or in solar energy storage technologies.

It is a further embodiment of the disclosure to provide a method for preparing metal oxide slurry and to form a patchwork surface structure with a nanoporous grain boundary using high pressure wet-atomization.

In a further embodiment zinc oxide is used as the metal oxide, which is useful for solar energy storage.

In another embodiment a gadolinium doped ceria (GDC) is used as the metal oxide, and the slurry contains polyvinyl butyral as a binder.

In another embodiment it is an object to provide a method that, after the wet-atomization forms a substrate coated with the GDC slurries which is subsequently co-sintered at 1400° C. to obtain a GDC electrolyte exhibiting a unique patchwork type surface structure having a nanoporous gram boundary.

BRIEF DESCRIPTION OF THE DRAWINGS

A more complete appreciation of the disclosure and many of the attendant advantages thereof will be readily obtained as the same becomes better understood by reference to the following detailed description when considered in connection who the accompanying drawings, wherein:

FIG. 1B is a microstructure of the GDC electrolyte shown in FIG. 1C at higher microstructure (×30,000).

DETAILED DESCRIPTION OF THE EMBODIMENTS

Figure 1:
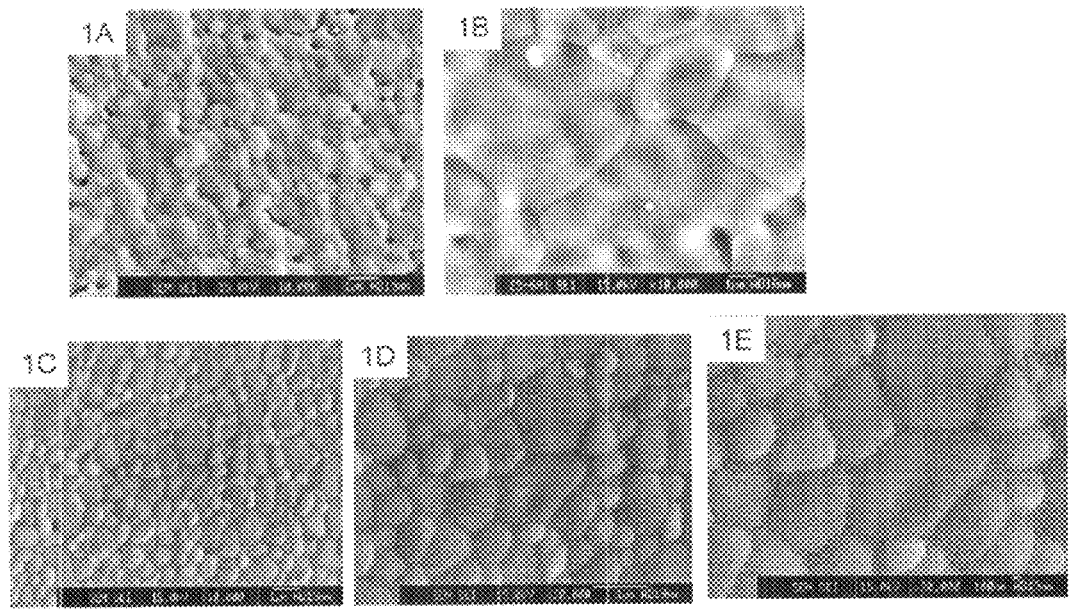
FIG. 1A is a microstructure (×10,000) of the electrolyte surface sintered at 1250° C. for 1 hour after coating with atomized GDC mixed with 8 wt. % polyvinyl butyral (PVB) polymer on top of the anode support.
FIG. 1B is a microstructure (×10,000) of the electrolyte surface sintered at 1400° C. for 1 hour after coating with atomized GDC mixed with 8 wt. % PVB polymer on top of the anode support.
FIG. 1C is a microstructure (×10,000) of the electrolyte surface sintered at 1400° C. for 1 hour after coating with atomized GDC mixed with 10 wt. % PVB polymer on top of the anode support.
FIG. 1D is a microstructure of the GDC electrolyte shown in FIG. 1C at higher magnification (×20,000).

Referring now to the drawings, wherein like reference numerals designate identical or corresponding parts throughout the several views.

A gadolinium-doped cerium oxide slurry having a patchwork-type surface structure having a nanoporous grain boundary was prepared by mixing gadolinium-doped cerium oxide and a polymer binder to form a first mixture, wet-atomizing the first mixture under high pressure to obtain a second mixture, coating the second mixture to a substrate, and sintering the coated substrate to form a layer having a patchwork-type structure in a polygonal or honeycomb structure form. The patchwork-type structure has polygonal grains having a size of from 0.1 µm to 3 µm, preferably 0.5-2 µm or 1.0-2.0 µm and a nanoporous grain boundary having nanopores with a diameter of from 0.01 µm to 0.7 µm.

The pressure used during wet atomization while preparing gadolinium-doped cerium oxide slurries is from 100 to 200 MPa, preferably 130 to 170 MPa, more preferably approximately 150 MPa. Particular fluid flow pressure provides ultrafine GDC slurries with highly-dispersed and homogeneous distribution.

Examples

A fluid mixture and/or suspension containing a Gd oxide was pumped raider different pressure during atomization. When the fluid mixture and/or suspension was atomized by applying a pressure of 100 MPa to the same sample 3 times, the mean particle size diameter was about 0.67 µm. The particle size was shifted to a higher value after atomization by a pressure of 200 MPa. This might be due to the agglomeration of the particles. Actually, the higher the pressure, the greater the temperature rise in the liquid. This high pressure promotes the deterioration of the dispersion liquid component and agglomeration. It was determined that a high pressure of 150 MPa or less, preferably 100 MPa or less is required in order to achieve ultrafine GDC slurries with high dispersion.

The wet-atomizing process was repeated up to 5 times, preferably repeated 3 times. Next the number of atomizing process cycles was determined while keeping the same parameters over the same sample (repeated 1-5 times). The mean particle size's diameter ($D_{50}$) was 0.36 µm after atomizing only one time at a pressure of 150 MPa. The particle size distribution was shifted to a lower value alter repeating the process three times at a pressure of 150 MPa. The particle size distribution was shifted slightly to higher values after repeating the atomizing five times. The particle sixes ware in the range of 100-200 nm and homogeneously dispersed. The particles were spherical, and termed patchwork-type or honeycomb structure layers in various sizes.

The fluid mixture used in preparing gadolinium-doped cerium oxide additionally contains ethanol and an organic solvent seen as toluene or suspension medium. The fluid mixture preferably contains ethanol and toluene as a solvent, preferably in combination with water. The fluid mixture used in preparing gadolinium-doped cerium oxide preferably contains an amine dispersant.

To form a gadolinium-doped cerium oxide electrolyte layer the slurry is sintered on a substrate using a sintering temperature of from 1300 to 1450° C., preferably from 1350 to 1425° C., or about 1400° C.

Very smooth surfaces were observed by using atomized GDC slurries upon an addition of 8 wt. % PVB polymer (FIGS. 1A and 1B). FIGS. 1A and 1B show the SEM images of the surface of the thin slurry layer co-sintered at 1250° C. and 1400° C., respectively. When die substrate coated with the GDC slurries prepared by the wet-atomization method was sintered at 1400° C., the grain size became larger, ranging approximately from 1 µm to 6 µm, compared to that of the coated substrate sintered at 1250° C.

FIG. 1B shows a crack-free, smooth and dense GDC electrolyte having a patchwork-type surface structure, but no nanoporous grain boundary was observed. It is observed that grain growth and densification took place without creating any cracks on the electrolyte surface. Below 1300° C., some hole-like structure are observed at some of the grain boundaries (see FIG. 1A), which disappear at above 1400° C. (see FIG. 1B). The SEM image (see FIG. 1A) of a GDC atomized sample that was sintered at 1250° C. for 1 h showed that all of the grains were fairly regular. Most of the grains were smaller than 0.5 µm (500 nm) in size and some of the grains were as small as 0.2 µm (200 nm). This is an important finding, since the presence of ultra fine grains is known to enhance many properties, such as ionic conductivity and mechanical strength [Schoonman, J., 2003, "Nanoionics", Solid State Ionics, 157, pp. 319-32—incorporated herein by reference].

Figure 2:
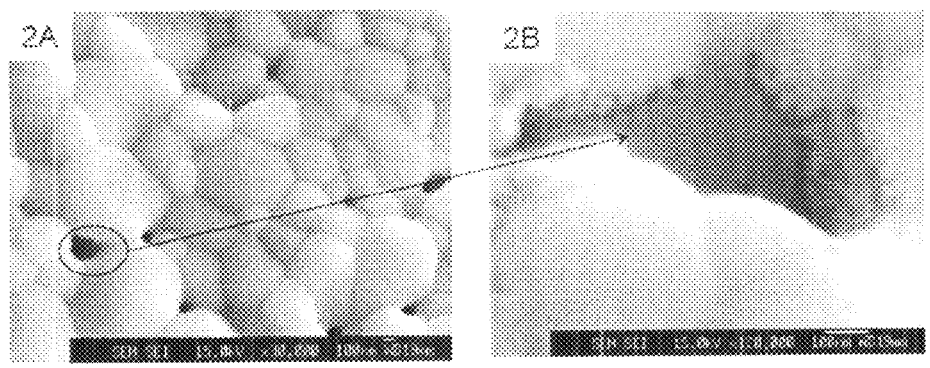
FIG. 2A shows electrolyte surface image (×30,000) sintered at 1250° C. for 1 hour after coating with 16 wt. % PVB polymer.
FIG. 2B is an enlarged image (×120,000) of the electrolyte surface image of FIG. 2A.

The fluid first mixture used in preparing gadolinium-doped cerium oxide slurries preferably contains polyvinyl butyral (PVB) as a binder. The amount of the PVB in the first mixture is preferably from 12 to 20%, more preferably from 14 to 18%, or about 16% by weight based on the total weight of the fluid mixture or suspension. A nanoporous grain boundary was found to form when the fluid mixture used to form an electrolyte layer contained 16 wt. % PVB polymer. It is remarkable to note that the nanoporous grain morphology was formed on all of the surroundings of all of the grains in respect to smaller and larger sizes (see FIGS. 1C, 1D and 1E). FIGS. 2A and 2B show microstructures of the GDC slurry surface sintered at 125° C. at magnifications of ×30,000 (FIG. 2A) and ×120,000 (FIG. 2B). The hole-like structures, ranging from 0.1 µm to 0.3 µm, including holes having a diameter of 0.2 µm, as well as tiny pores at some of the grain boundaries of the same range of diameter, are observed even at 1250° C.

Figure 3:
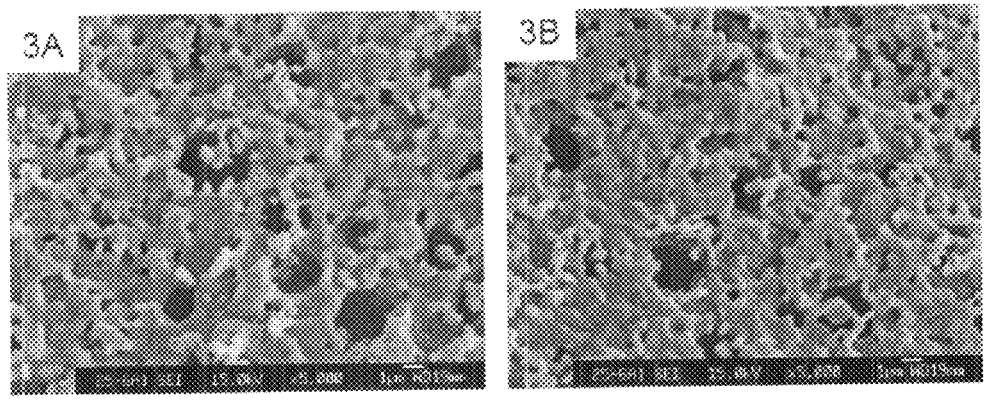
FIG. 3A is a microstructure (×5,000) of the electrolyte surface sintered at 1400° C. for 1 hour after coating with atomized GDC mixed with 1.6 wt. % pyrrolidinone polymer on top of the anode support.
FIG. 3B is a microstructure (×5,000) of the electrolyte surface sintered at 1400° C. for 1 hour alter coating with atomized GDC mixed with 16 wt. % polytetrafluoroethylene polymer on top of the anode support.

The polymer binder used in preparing gadolinium-doped cerium oxide is preferably neither polyvinyl pyrrolidinone (PVP) nor polytetrafluoroethylene (PTFE), and/or contains no amounts of these polymers. The effect of different polymers, such as PVP and PTFE, into the electrolyte slurry was tested. FIG. 3A shows a microstructure (×5,000) of the electrolyte surface sintered at 1400° C. for 1 hour after coating with atomized GDC mixed with PVP polymer (16 wt. %) on top of the anode support. FIG. 3B shows a microstructure (×5,000) of the electrolyte surface sintered at 1400° C. for 1 hour after coating with atomized GDC mixed with PTFE polymer (16 wt. %) on top of the anode support. When PVP or PTFE polymer is used instead of PVB as the binder, the surface of the GDC slurry became less smooth and contains a number of hole-like structures. However, no nanoporous structure in the grain boundary was observed (FIGS. 5A and 3B), even after sintering at 1400° C. This may be due to the low solubility of PVP and PTFE into a toluene and ethanol mixture. It looks like natural patchwork-type morphology.

At least three essential parameters seem to be important in order to fabricate a nanoporous patchwork type morphology; namely: (i) the use of a fluid mixture or slurry containing an excess (e.g., 16 wt. %) of PVB polymer; (ii) co-sintering at high temperature, e.g., above 1400° C.; and (iii) sintering on a highly porous preferably ceramic support. The porous netting morphology was formed only in the periphery of the boundaries of all grains, as shown in FIGS. 1C and 1D with a magnification 20,000 and 30,000, respectively. FIGS. 1C, 1D and 1E show microstructures of the GDC slurry surface sintered at 1400° C. The same area was magnified at ×10,000 (FIG. 1C); ×20,000 (FIG. 1D); and ×30,000 (FIG. 1E). FIG. 1C shows a reduction of the constituent particles when the amount of PVB is increased from 8% to 1.6%. FIG. 1E shows a very hue porous structure at all of the grain boundaries, which is suitable for preparing a dense electrolyte thin film. The patchwork-type morphology might be due to abnormal interfacial energy and the homogeneous distribution of the polymer particles, it may be possible to separate a single grain after the fabrication of the unique nonporous morphology. This might be possible because the nonporous grain boundary was formed on top of the highly porous GDC-NiO support.

Figure 4:
FIG. 4A shows the GDC-NiO tube coating with GDC electrolyte sintered at 1400° C.
FIG. 4B shows the extruded GDC-NiO tube.
FIG. 4C shows the cross-sectional image of the GDC-NiO tube of FIG. 4A.
FIG. 4D shows the porous anode microstructure.
Figure 4:
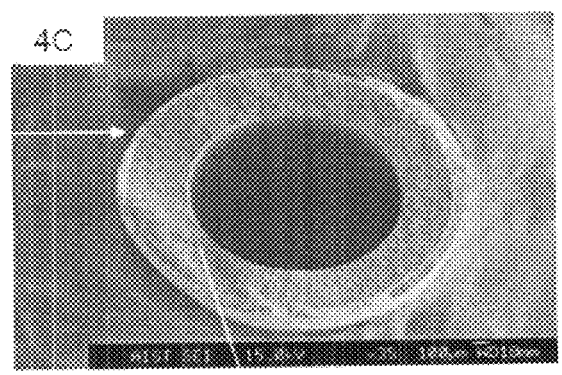
Figure 4:
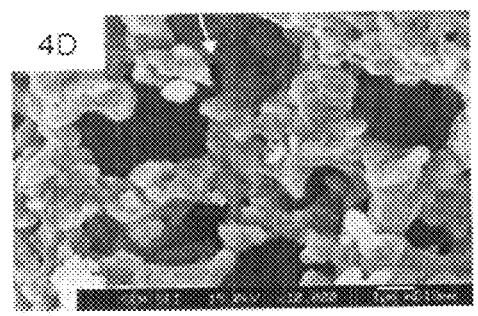

FIG. 4 shows art extruded GDC-NiO tribe and its cross-sectional image coated with GDC. FIG. 4 also shows porous anode microstructure and an inside image (FIG. 4A-4D). [FIG. 4B shows as extruding GDC-NiO tube and FIG. 4A shows alter coating GDC electrolyte sintered at 1400° C.

The above nanoporous grain boundary was observed when, the slurry of GDC was coated on the top of as-extruded anode tubes (support) and the dip-coated anode tubes were co-sintered at 1400° C. for 1 h in air. A porous anode support was obtained after co-sintering at 1400° C. for 1 h in air. The electrochemical performance of a Solid Oxide Fuel Cell (SOFC) was extensively improved when, the size of constituent particles was reduced so as to yield a highly porous anode (support) microstructure.

This patchwork-type nanoporous with netting boundary fabrication technology is a contrary phenomenon in comparison with the Zener pinning effect, because the Zener pinning effect did not consider the influence of porous support and high temperature co-sintering [Flewitt, P. E. J., Wild, R. K., 2001, "Grain Boundaries: Their Microstructure and Chemistry," Wile publication; 1 edition, ISBN-10: 0471979511—incorporated herein by reference]. Studies of a porous ceramics grain boundary are hardly found in the available literatures. An understanding of porous boundary formation and its structure will become a crucial step in helping to draw new processing strategies [see: Lin, C. J., and Wei, W. C. J., "Grain boundary pinning of polycrystalline $Al_2O_3$ by Mo inclusions," 2008, Mater. Chem. Phy., 111, pp. 82-86; Kageyama, Y., Murase, Y., Tsuchiya, T., Funabashi, H., and Sakata, J., 2002, "Formation of porous grain boundaries in polycrystalline silicon thin films," J. Appl. Phys., 91, pp. 9408-9413; and Suzuki, T., Zahir, H., Funahashi, Y., Yamaguchi, T., Fujishiro, Y., and Awano, M., 2008, "Fabrication and Characterization of Microtubular SOFCs with Multilayered Electrolyte," Electrochem. Solid State Lett., 11, pp. B87-90; —each incorporated herein by reference]. It is an extraordinarily surprising finding because no research has yet been reported which shows a nanoporous patchwork-type grains morphology. This technology might play an important role in materials processing, grain recovery and separation. Therefore, the present technology is of interest to scientists in other fields.

A metal oxide film having a patchwork-type surface structure with a nanoporous grain boundary was also prepared by wet-atomizing metal oxide under a pressure of at least 100 MPa to obtain a fluid mixture or suspension, and sintering the fluid mixture or suspension, to form the metal oxide film. The metal oxide film may be a gadolinium-doped cerium oxide film or zinc oxide film. An integrated photoelectrochemical device can be constructed using this technology.

The present invention was achieved by an atomization technique and a unique natural patchwork-type nanoporous grain boundary was obtained when the polymer content was 16 wt. % or greater in the slurries. The results of this study show that polymers (binder) can be used not only to fabricate a dense electrolyte, but also to generate a nanoporous grain boundary. This technology can be applied in the field of solar energy storage.

Method and Materials

GDC Slurry Preparation

The GDC slurry seas prepared by mixing commercially available $Gd_{0.2}Ce_{0.8}O_{2-x}$ (Shin-Etsu Chemical Co., Ltd. Japan, 99.99%) powder with a specific surface area of about 12.6 $m^2g^{-1}$, ethanol and toluene as a solvent, polyvinyl butyral as a binder and air amine as a dispersant. The slurries were then stirred for 2 h before atomization in the present invention, the final mixing process was carried out by (a) atomization and also by (b) ball milling for the purpose of comparison. The ball milling process was performed for 24 h using high grade $ZrO_2$ balls with a diameter of 3 mm.

Wet Atomizing System

The atomization of GDC slurry was earned out by using a wet atomizer. A round shaped steel device with an extremely narrow hole was used in the present by first washing in distilled water followed by ultrasonic cleaning for 30 min in ethanol.

Dispersion by means of a high pressure is performed by passing a metal oxide-containing liquid through an extremely narrow (small) gap at high speed with a pressure of 100-200 MPa. By changing the fluid flow pressure—namely 100, 150 and 200 MPa—and repeating the atomization process up to 5 times, an a highly dispersed GDC slurry is termed for use as an electrolyte precursor. The slurries were collected into a container after each step of atomization. The slurries prepared in this manner were stored in an air-tight bottle at 4° C. until ready to use.

Md. H. Zahir & T. Suzuki, "Effects of Polymer Binder in Electrolyte Slurries and Their Microtubular SOFC Applications," Journal of Fuel Cell Science and Technology, April 2013, Vol. 10 is incorporated herein by reference in its entirely.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define in part the scope of the foregoing claim terminology such that no inventive subject matter is dedicated to the public.

The invention claimed is:

1. A method for preparing a gadolinium-doped cerium oxide slurry having a patchwork surface structure with a nanoporous grain boundary, the method comprising:
   mixing a gadolinium-doped cerium oxide and a polymer binder, thereby forming a first mixture having 12 to 20% by weight of the polymer binder;
   wet-atomizing the first mixture under a pressure of 100 to 200 MPa, thereby obtaining a second mixture;
   coating the second mixture on a substrate, thereby forming a coated substrate; and
   sintering the coated substrate at a temperature of 1300 to 1450° C.,
   wherein the patchwork structure has polygonal grains having a size of from 0.1 μm to 3 μm; and
   wherein the nanoporous grain boundary is present on all surroundings of all of the polygonal grains.

2. The method of claim 1, wherein the pressure during the wet atomizing is about 150 MPa.

3. The method of claim 1, wherein the pressure during the wet atomizing is from 130 to 170 MPa.

4. The method of claim 1, wherein the wet-atomizing is repeated up to 5 times.

5. The method of claim 1, wherein the wet-atomizing is repeated 3 times.

6. The method of claim 1, wherein the polymer binder is polyvinyl butyral.

7. The method of claim 1, wherein the polymer binder is not polyvinyl pyrrolidinone.

8. The method of claim 1, wherein the polymer binder is not polytetrafluoroethylene.

9. The method of claim 1, wherein the first mixture further comprises ethanol and toluene as a solvent or suspension medium.

10. The method of claim 1, wherein the first mixture further comprises an amine as a dispersant.

11. A gadolinium doped cerium oxide electrolyte prepared by the method of claim 1.

12. The method of claim 1, wherein the nanoporous grain boundary has nanopores with a diameter of from 0.01 μm to 0.7 μm.

13. The method of claim 1, wherein the sintering is sintering at a temperature of from 1350 to 1425° C.

14. The method of claim 1, wherein the first mixture has 14 to 18% by weight of the polymer binder.

15. The method of claim 1, wherein the first mixture has about 16% by weight of the polymer binder.

16. The method of claim 1, wherein the polygonal grains have a size of from 0.5 μm to 2 μm.

\* \* \* \* \*